United States Patent [19]

Vale et al.

[11] Patent Number: 5,247,437
[45] Date of Patent: Sep. 21, 1993

[54] METHOD OF MANAGING INDEX ENTRIES DURING CREATION REVISION AND ASSEMBLY OF DOCUMENTS

[75] Inventors: Donald A. Vale, San Diego; Garth Ware, Encinitas, both of Calif.

[73] Assignee: Xerox Corporation, Stamford, Conn.

[21] Appl. No.: 591,353

[22] Filed: Oct. 1, 1990

[51] Int. Cl.⁵ .......................... G06F 9/00; G06F 15/20
[52] U.S. Cl. ................................ 364/419.19; 395/144
[58] Field of Search ................. 364/419; 395/144–149

[56] References Cited

U.S. PATENT DOCUMENTS 4,648,067 3/1987 Repass et al. ....................... 364/900

FOREIGN PATENT DOCUMENTS 0375145 6/1990 European Pat. Off. .
0384185 8/1990 European Pat. Off. .

Primary Examiner—Gail O. Hayes
Attorney, Agent, or Firm—Daniel J. O'Neill

[57] ABSTRACT

There is provided a method of managing index entries during creation, revision and assembly of a document. The occurrence of an index entry in the document is defined by a document index node (DIN). The relationship between index entries is defined by an index data structure that consists of heading nodes (HN), with each HN including the title of its associated index entry, and that maintains the relationship between HNs by keeping a record for each HN of the next sibling HN and the first child HN. The method includes first scanning the document for DINs. Next there is determined for each DIN encountered a page instance node (PIN). The PIN includes the number of the document page on which the DIN was encountered, and associates the PIN with the HN by including in the HN a pointer to the PIN, provided the PIN is the first PIN to be associated with the HN. Otherwise, the PIN associates the PIN with the previous PIN by including in the previous PIN a pointer to the PIN.

2 Claims, 7 Drawing Sheets

| ID | NAME | STATUS |
|---|---|---|
| 1 | SOUPS | U |
| 2 | VEGETABLES | D |
| 3 | DESERTS | U |
| 4 |  | A |
| 5 |  | A |
| ⋮ | ⋮ | ⋮ |
| 15 |  | A |

(U = INUSE, D = DELETED, A = AVAILABLE)

*FIG. 3*

METHOD OF MANAGING INDEX ENTRIES DURING CREATION REVISION AND ASSEMBLY OF DOCUMENTS

This invention relates generally to indexing documents, and more particularly to a method of managing index entries during creation, revision and assembly of documents.

BACKGROUND OF THE INVENTION

Computer-based tools to aid in the preparation of indexes fall into two general classes. The first class of indexing systems are those that collect the keywords and page references for the index automatically, from an electronic version of the manuscript. To identify the words to be collected to the index, these systems use either explicit markup, automatic extraction of all words (filtered by inclusion or exclusion lists), or a combination of both methods. The primary benefit of these systems is that since the page references and keywords are generated automatically, they can easily be updated when the electronic document is modified.

The second class of indexing systems are those that depend on a human to enter the keywords and page references manually, but then allow subsequent electronic manipulation of the entries. The benefit of these systems is that they provide assistance in editing the index entries after the index has been compiled.

Both classes of indexing systems generally perform adequately. However, while world extraction is easy to use for the first class, it generates inferior single-word indexes. Explicit inclusion allows greater control over which words appear in the index. A more significant drawback is that using either class of system systems, the task of specifying the content of an index for a manuscript is usually tedious and time consuming. Not only are the mechanics of creating the index daunting; indexing is also a demanding creative endeavor. Once the keywords making up an index have been identified, they must be honed, shaped, and edited to properly reflect the meaning and scope of the manuscript. The effort devoted to editing keywords in an index can be equal to or greater than the effort applied to editing the body of the manuscript. Existing indexing systems of the first class offer little support for this editing. Any editing that is done on the constructed index must be repeated each time the index is generated.

SUMMARY OF THE INVENTION

The present invention is directed towards a method of managing index entries during creation, revision and assembly of a document. The occurrence of an index entry in the document is defined by a document index node (DIN). The relationship between index entries is defined by an index data structure that consists of heading nodes (HN), with each HN including the title of its associated index entry, and that maintains the relationship between HNs by keeping a record for each HN of the next sibling HN and the first child HN. The method includes the steps of firstscanning the document for DINs. Next, for each DIN encounter there is determined a page instance node (PIN). The PIN includes the number of the document page on which the DIN was encountered. Further, the PIN is associated with the HN by including in the HN a pointer to the PIN, provided the PIN is the first PIN to be associated with the HN, and otherwise associating the PIN with the previous PIN by including in the previous PIN a pointer to the PIN.

Other aspects of the present invention will become apparent as the following description proceeds and upon reference to the drawings, in which:

BRIEF DESCRIPTION OF THE DRAWINGS

FIG. 3 is a schematic representation of a MetaIndex Table, showing the status of various indexes and the ID number assigned each index;

DESCRIPTION OF THE PREFERRED EMBODIMENT

Figure 1:
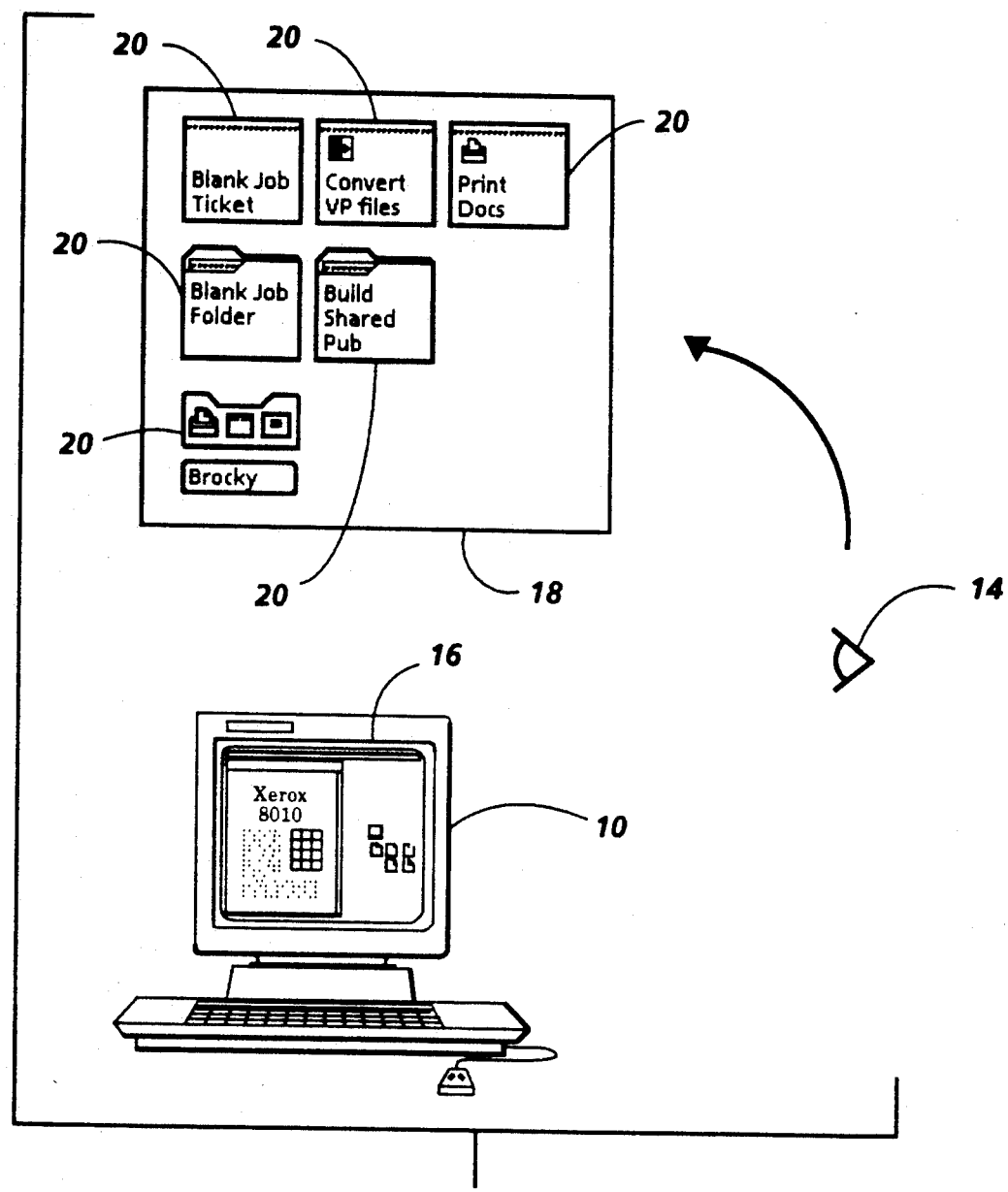
FIG. 1 is a pictorial representation of a Xerox 6085 workstation, including a display that displays a desktop having various icons.

For a more detailed understanding of the invention, reference is made to FIGS. 1 through 7. Referring now to FIG. 1, there is shown a Xerox 6085 workstation 10. User 14 of workstation 10 views display 16 on which there is shown desktop 18. Desktop 18 displays various icons 20. Icons 20 are desktop objects. One type of icon 20 is an index icon (not shown). An index icon is an electronic file that can reside in a container, called a publication (not shown), along with body text and other elements that will be included in the final document. Further information on publications is available from Xerox Corporation.

Each publication can have multiple indexes. To keep track of the indexes, attached to each publication is a meta index table (e.g., meta index table 22 in FIG. 3). This table assigns a unique multi-bit Index ID for each index file that the Publication includes. The indexes may be generated in any of a number of manners well known to one skilled in the art. The number of bits in the Index ID constrains the number of different indexes that can be generated from the electronic manuscript. For example, in FIG. 3 there is shown meta index table 22. Meta index table 22 is associated with the publication that contains the Soup index. In meta index table 22, there are two active indexes, Soups 23, given index ID number 1, and Deserts 24, given index ID number 3. The status of one index, Vegetables 25, is shown as deleted. If a new index were added (e.g., salads 24), it would be assigned an ID numbered 4. Deleted index IDs, such as Vegetables 25, are reclaimed at index generation time.

Figure 2:
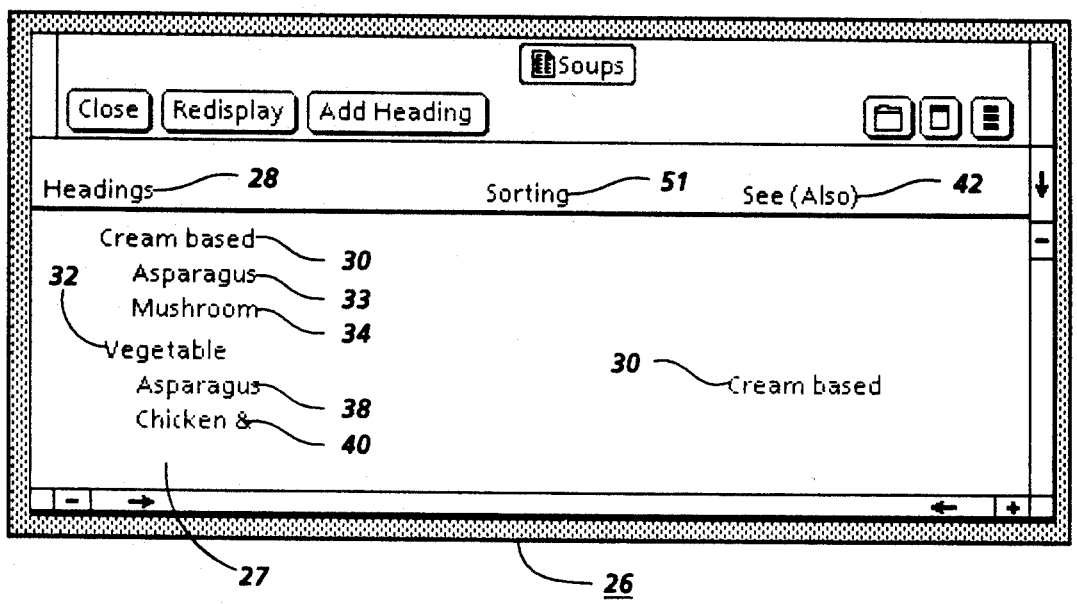
FIG. 2 is a schematic representation of a window displayed on a desktop of a workstation, the window showing the headings of an index.

Referring now to FIG. 2, opening an index icon yields a window, such as window 26 associated with the soup index (not shown). Window 26 displays a keyword list 27 that indicates the structural relationship of the keywords or headings for the given index. For example, in heading column 28 entries are given for Cream Based 30 and Vegetable 32. Cream Based 30 has child entries of Asparagus 33 and Mushroom 34, while Vegatable 32 has child entries of Chicken & 40 and Asparagus 38, with Asparagus 38 having a reference in See (Also) column 42 to Cream based 30.

Figure 4:
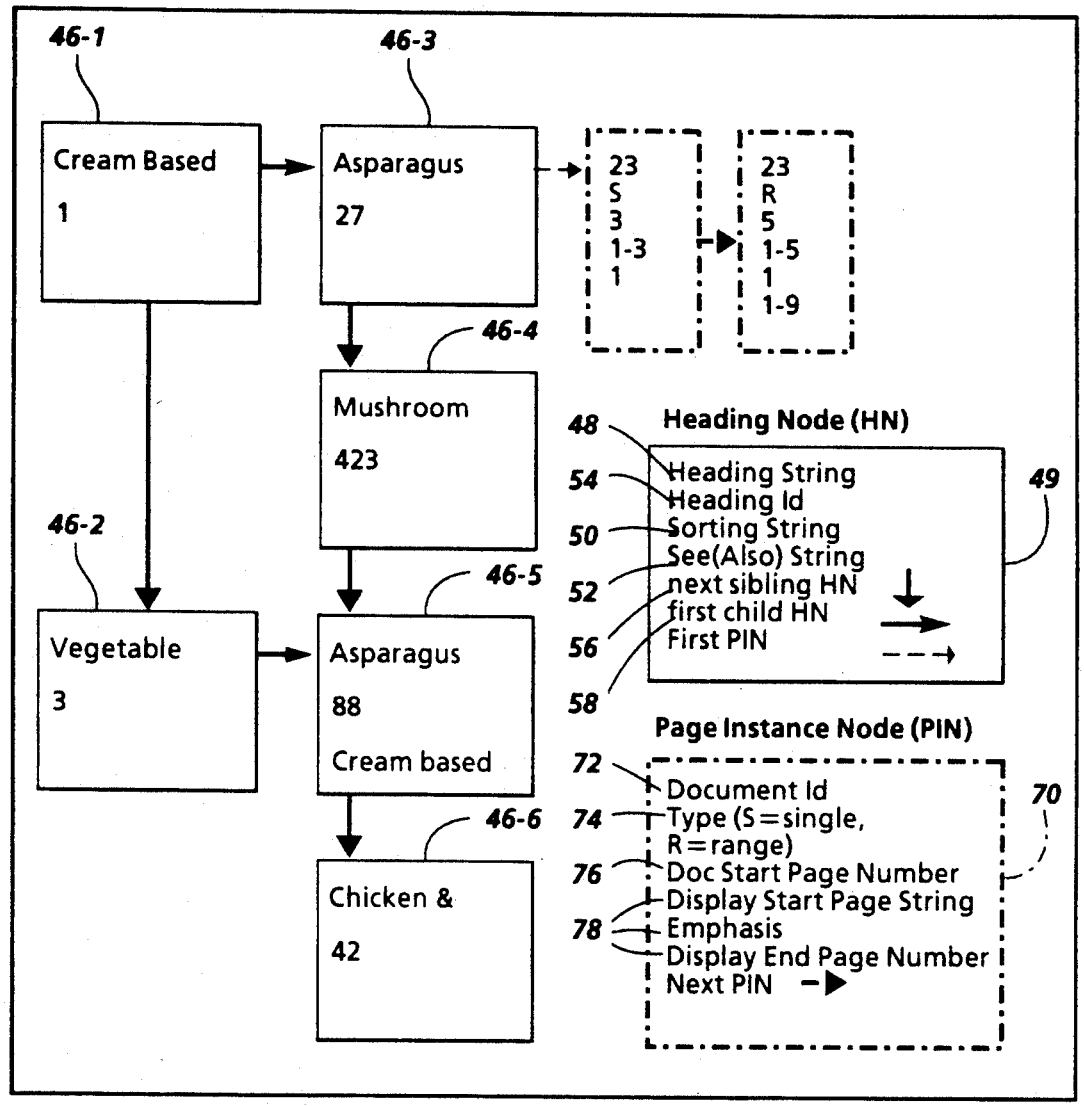
FIG. 4 is a pictorial representation of the Pageless Index Data Structures for the index displayed in FIG. 2, including the Heading Nodes and exemplary Page Instance Nodes.

Referring now to FIGS. 2 and 4, associated with each heading (e.g., Cream based 30) in the keyword list 27 is a heading node (HN) 46. FIG. 4 shows a pageless index data tree or structure 47 for heading nodes 46 of the keyword list 27 of window 26. Each heading node 46 defines information for one of the headings listed in the heading column 28 of keyword list 27. In FIG. 4 there is shown an exemplary HN 46 alongsie a pageless index data structure 47. HN 49 stores for its heading a heading or display string 48, sort string 50, see(also) string 52, and unique heading ID 54. Heading string 48 contains the title of the heading as listed in heading column 28 of keyword list 27, sort string 50 contains any heading titles listed in sorting column 51, and see(also) string 52 contains any heading listed in See(Also) column 42 (e.g., Cream based 30). Heading ID 54 is used as an index into a table (not shown) of pointers to heading nodes 46 that describe the relationship between HN 46 in the pageless index data structure 47. The table of pointers includes next sibling heading node pointer 46 and first child heading node pointer 58 for each HN 49, and thereby delineates the structural relationship of the keywords or headings for the given index (e.g., soups). Heading IDs 54 depicted in FIG. 4 include number 1 for Cream Based HN 46-1, number 3 for Vegetable HN 46-2, number 27 for Asparagus HN 46-3, number 423 for Mushroom HN 46-4, number 88 for Asparagus HN 46-5, and 42 for Chicken & HN 46-6.

Data structure 47 defines the relationships between index entries in the soup index, displayed in FIG. 2, by defining the relationships between HNs 46. For example, Cream based HN 46-1 and the See(Also) string entry of Asparagus HN 46-5 correspond to the cream based entries 30 of keywood list 27, and Vegetable HN 46-2 corresponds to the Vegetable entry 32 of keyword list 27. Asparagus entry 33 is shown to be the first child entry of Cream based entry 30 in keyword list 27, and data structure 47 shows corresponding and Asparagus HN 46-3 to be the first child heading node of Cream based HN 46-1. Similar correspondences exist between the remaining entries of keyword list 27 and the remaining HN 46 of data structure 47.

When a heading is added to the keyword list 27, a new heading node 46 is inserted into the data structure 47 at its sorted location. This incremental sorting of HNs 46 in the data structure 47 during HN 46 insertion is the only sorting that occurs. Subsequent sorting of HNs46 is not necessary, since the sorted relationship between HNs 46 is maintained.

Figure 5:
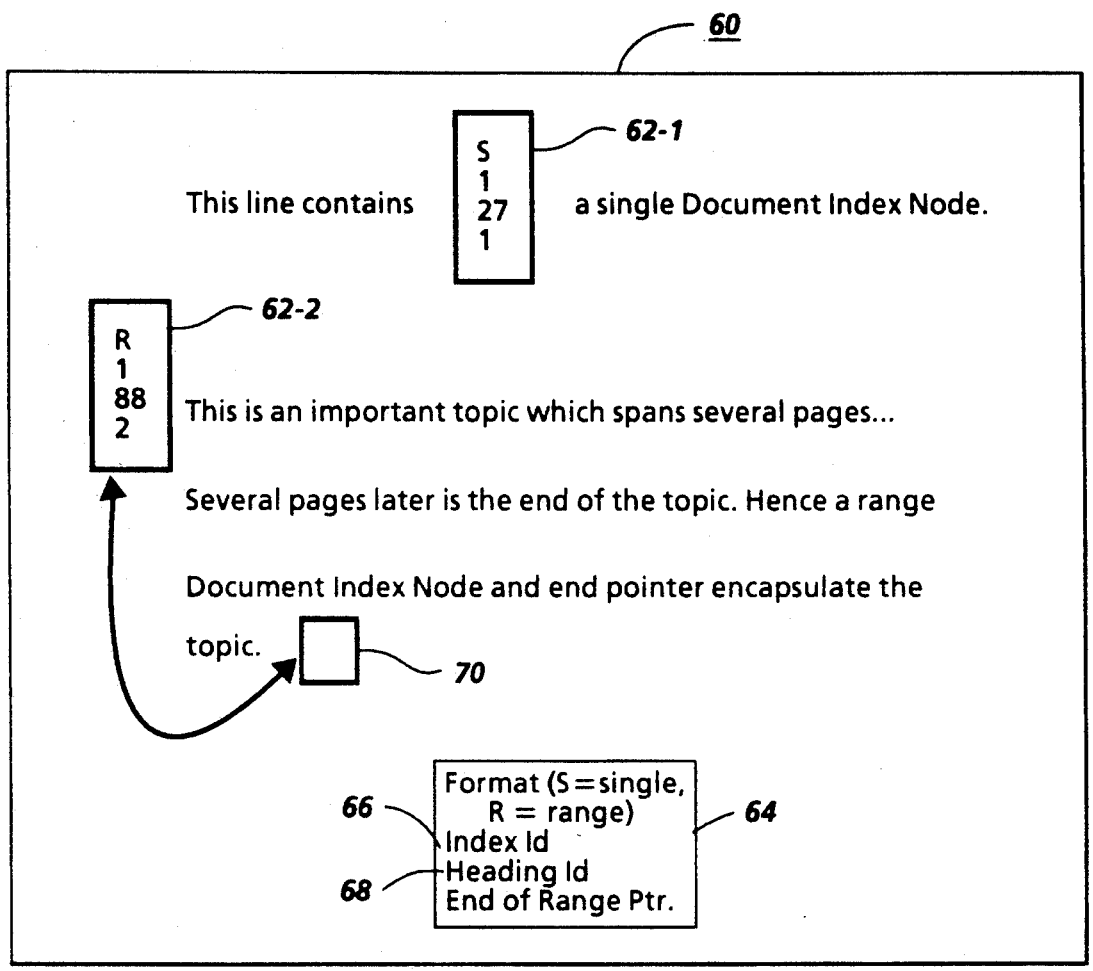
FIG. 5 is a pictorial representation of a portion of a publication, showing sample Document Index Nodes and their relationship to body text.

Referring now to FIGS. 4 and 5, in a publication 60 the occurences of each index entry is defined by one document index node (DIN) 62. An exemplary DIN 64 is shown in FIG. 5 overlaying publication 60. Each DIN 64, like other markers well known to one skilled in the art, is an electronic file that is not normally displayed. Each DIN 64 contains Index ID 66 and Heading ID 68 for an index entry, as well as information specific to its particular instant. There are two types of DINs 64, single DIN, such as DIN 62-1, and range DIN, such as DIN 62-2. Each single DIN defines a single location within publication 60. Each range DIN defines the beginning of a range of body text within publication 60, with the end of the range being defined by an end pointer, such as end pointer 70 of DIN 62-2, which is a pointer unique to its respective DIN.

The link between DINs 64 and the HN 46 structure maintained by data structure 47 is provided by Page Instance Nodes (PINs). An exemplary PIN 70 is shown alongside data structure 47 in FIG. 4. One PIN 70 is created for each DIN 64 in a document at the time the index is updated. PIN 70 includes a document ID 72, the type 74 of the DIN 64 (i.e., single or range), and entry 76 listing the starting page of the publication, as well as information 78 about the starting and ending pages of the text string linked to the DIN 64.

Index Generation of a publication involves the following steps described in the following pseudocode:

Read into memory the pageless index data structures for the indexes in the publication, discarding the PINs.

Scan each document in the publication for DINs. For each DIN found.

If DIN invalid (e.g., a range type missing an end of range pointer) replace with Nil (i.e., default) Index and Heading IDs.

If DIN is coalesced, update with new IDs.

Add PIN to Heading Node list, checking predecessor and suppressing duplicates.

Traverse each in-memory pageless index data structure and write out the index documents.

Write out the updated pageless indexes.

Figure 6:
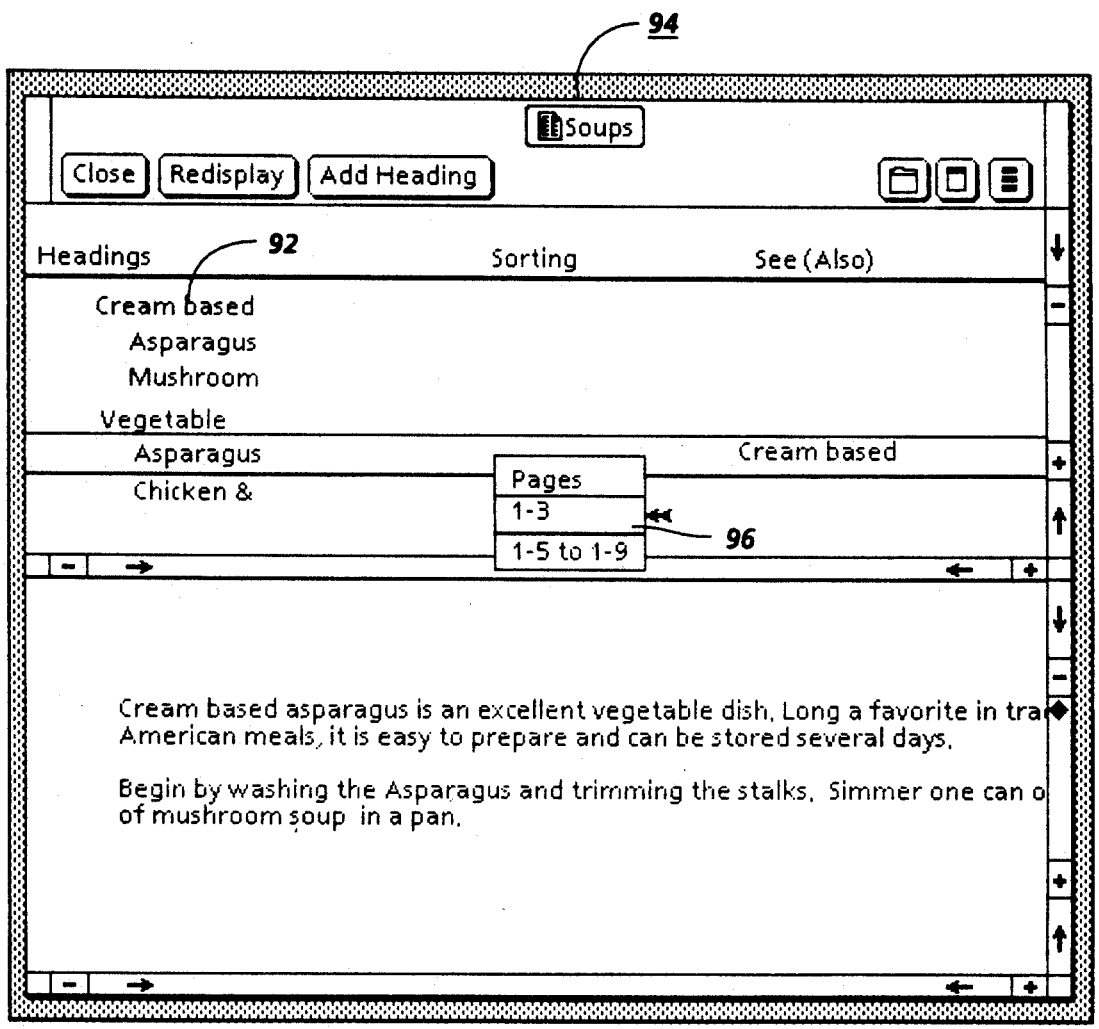
FIG. 6 is a pictorial representation of a Pageless Index for the index of FIG. 2, including a listing of the pages on which a certain indexed subheading appears.

Note that since a pageless index data structure (e.g., pageless index data structure 47) is already display ordered, no sorting is required when generating the index. The results of index generation is shown in FIG. 6, which displays a pictorial representation of a Pageless Index, represented by an open Soups index icon 94, for the index of FIG. 2, including a listing 96 of the pages on which a certain indexed subheading 92 appears.

Figure 7:
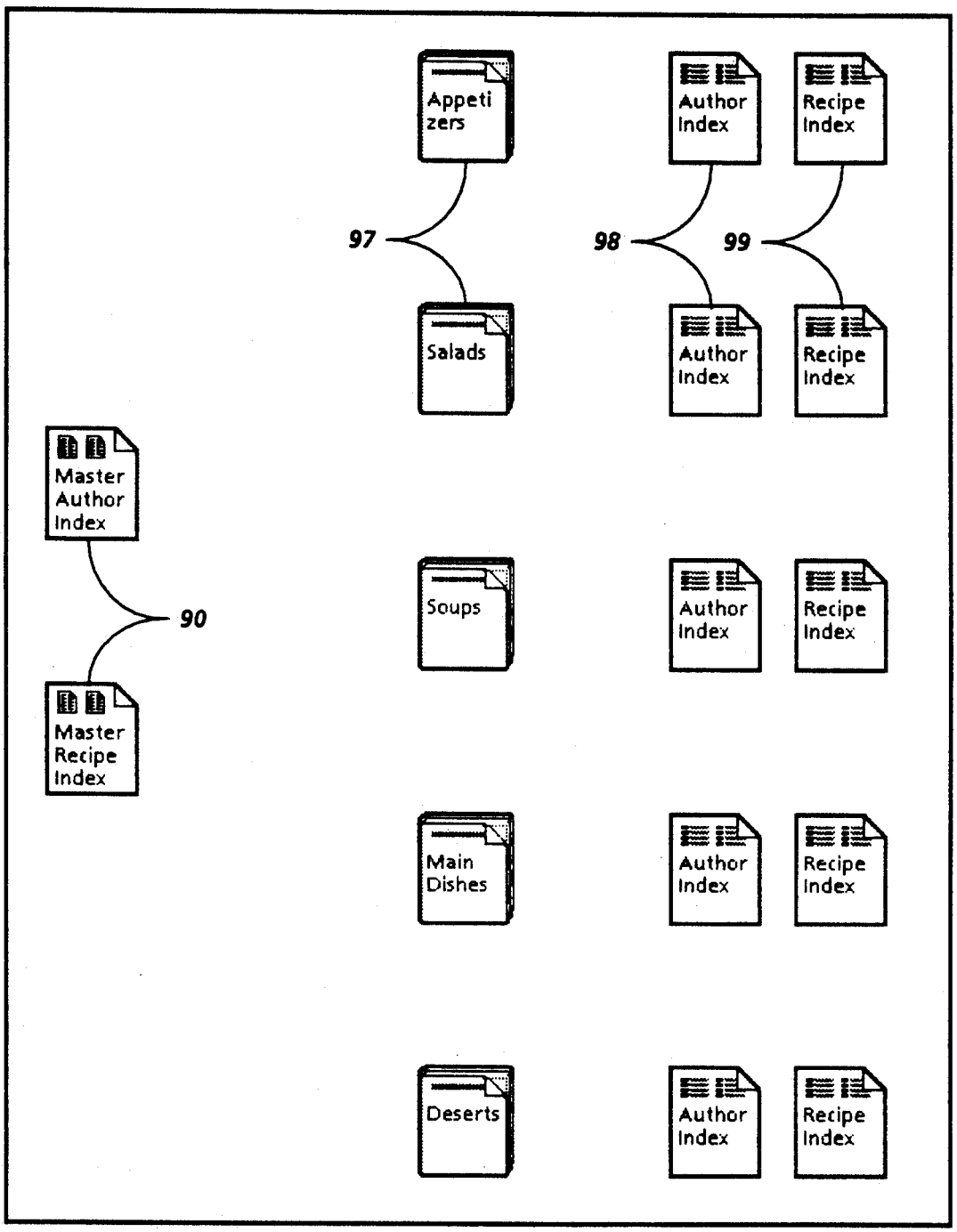
FIG. 7 is a pictorial representation of a Master Index for a publication containing multiple indexes.

A master index is an index containing headings from other indexes with page numbers prefixed with an abbreviated publication name. For example, FIG. 7 depicts a desktop having two master indexes, represented by closed master index icons 90, for a collection of food related publications, represented by closed publication icons 97. Each of the publications contains two indexes, one for authors, represented by closed icons 98, and one for recipes, represented by closed icons 99.

User 14 can add references to a master index in three ways, all begining by selecting the index(es) to be referenced. User 14 can, for example, copy the closed index(es) icon(s) 98 or 99 onto the closed master index icon 90, causing the references to created and placed at the end of the list. Alternatively, user 14 can copy the index(es) icon(s) 98 or 99 into the open master index icon (not shown), indicating the position in the list where the references should be created. Finally, user 14 can click the Make Reference shell command (not shown) and indicate the position in the list where the references should be created. Note that PROP'Sing the reference enables user 14 to specify a different display name to be used in the master index page references.

To generate a master index, there is first read into memory the live index data structures for the indexes referenced in the master index. Next, the output file is created for the master index. Then the union of the HN nodes is enumerate in sorted order. When two or more index data structures contain HN nodes with the same Heading, the page numbers are emitted from both in the order specified by the master index. Once a HN node's entries have been emitted, its subtree is enumerated according to the mathematical expression: (HN->first child HN). Finally, the output file is closed.

While the invention has been described with reference to the structures disclosed, it is not confined to the specific details set forth, but is intended to cover such modifications or changes as may come within the scope of the following claims.

What is claimed is:

1. A method of managing index entries during creation, revision and assembly of a document, with the occurrence of an index entry in the document being defined by a document index node (DIN), the relationship between index entries being defined by an index data structure that consists of heading nodes (HN), with each HN including the title of its associated index entry, and that maintains the relationship between HNs by keeping a record for each HN of the next sibling HN and the first child HN, the method including the steps of:

scanning the document for DINs; and
   determining for each DIN encountered a page instance node (PIN), the PIN including the number of the document page on which the DIN was encountered, and associating the PIN with the HN by including in the HN a pointer to the PIN, provided the PIN is the first PIN to be associated with the HN, otherwise associating the PIN with the previous PIN by including in the previous PIN a pointer to the PIN.

2. A method of managing index entries during creation, revision and assembly of a document, with the occurrence of an index entry in the document being defined by a document index node (DIN), the relationship between index entries being defined by an index data structure that consists of heading nodes (HN), with each HN including the title of its associated index entry, and that maintains the relationship between HNs by keeping a record for each HN of the next sibling HN and the first child HN, the method including the steps of:

scanning the document for DINs; and
   determining for each DIN encountered a page instance node (PIN), the PIN including the number of the document page on which the DIN was encountered, and associating the PIN with the HN by including in the HN a pointer to the PIN, provided the PIN is the first PIN to be associated with the HN, otherwise associating the PIN with the previous PIN by including in the previous PIN a pointer to the PIN.

* * * * *